UNITED STATES PATENT OFFICE.

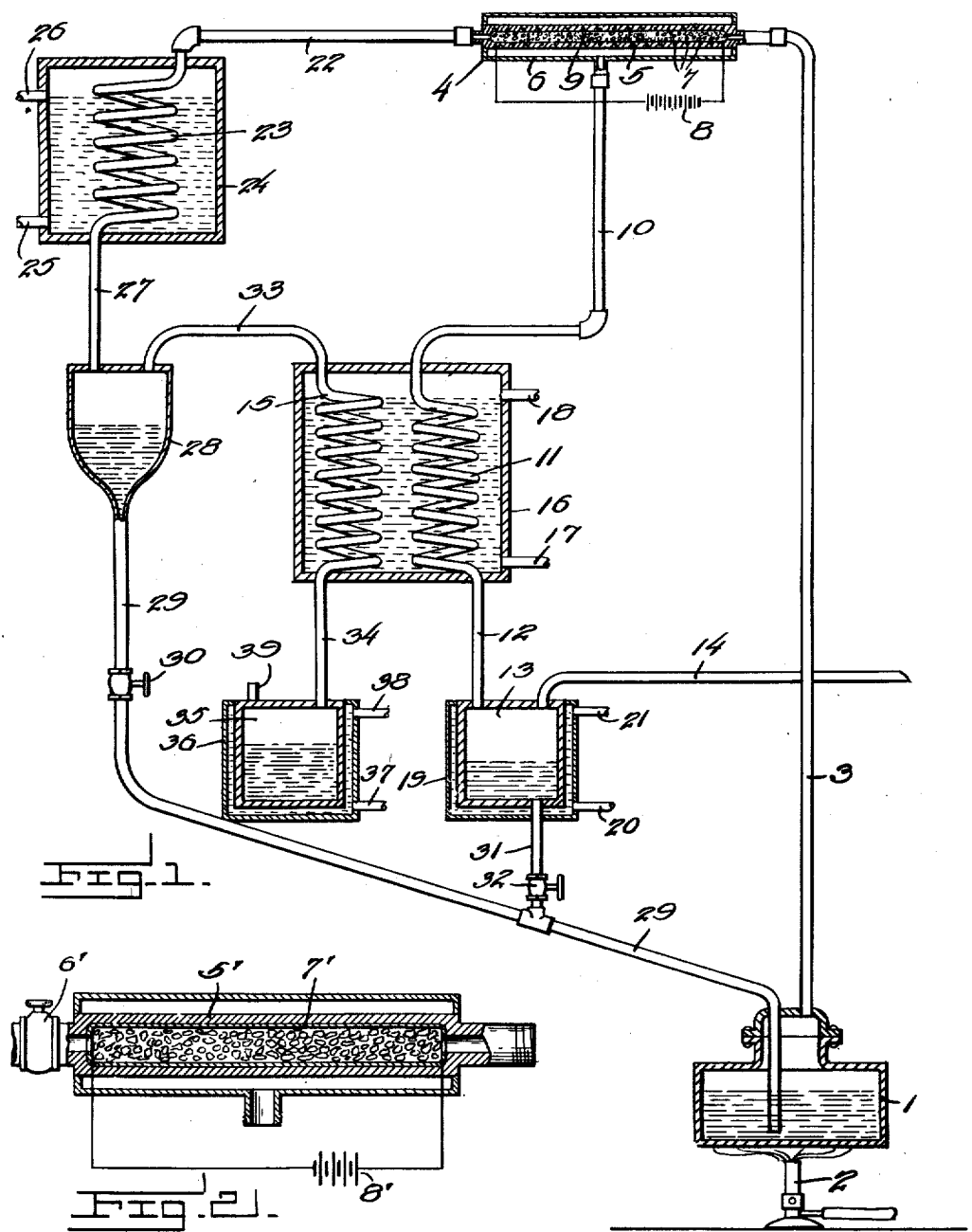

WALTER O. SNELLING, OF PITTSBURGH, PENNSYLVANIA.

PROCESS OF EFFECTING DISSOCIATIVE REACTIONS UPON CARBON COMPOUNDS.

1,124,347.  Specification of Letters Patent.  Patented Jan. 12, 1915.

Application filed September 5, 1913. Serial No. 788,299.

*To all whom it may concern:*

Be it known that I, WALTER O. SNELLING, a citizen of the United States, residing at Pittsburgh, in the county of Allegheny and State of Pennsylvania, have invented certain new and useful Improvements in Processes of Effecting Dissociative Reactions upon Carbon Compounds, of which the following is a specification.

This invention relates to processes of effecting dissociative chemical reactions, and comprises a method of effecting dissociative reactions upon organic compounds containing hydrogen wherein the organic body in question is exposed in a vaporous or gaseous condition to a controlled dissociative heat in a chamber having a wall of material which is porous or is permeable to hydrogen, the hydrogen formed in the reaction escaping through such wall and being steadily removed, such removal of the hydrogen acting to cause the dissociative reaction to go forward beyond the point of equilibrium at first produced.

Carbon compounds containing hydrogen in many cases when exposed to a regulated high temperature (alone or mixed with other reacting substances) tend to undergo a reversible dissociative reaction with molecular rearrangement and production of hydrogen. This hydrogen production, however, invariably goes forward to a certain equilibrium and then stops, the point of equilibrium being that at which partial pressures of the produced hydrogen and of the other dissociative product bear a certain mutual relation. I have found that by removing the hydrogen as it is formed, this equilibrium is disturbed, and the reaction then goes forward further, and in many cases may go on to completion. This fact may be advantageously utilized by performing the dissociative reaction in a chamber having one or more walls made of material permeable to hydrogen and removing hydrogen beyond the wall as it is formed, thereby lowering the partial pressure of hydrogen within the chamber.

The described process is useful in many relations. Thus, for example, natural gas which is mainly methane, can be converted into a gas of better properties and higher luminescent value by removing a portion of the hydrogen, which hydrogen may be utilized. By the reaction of methane and water vapor, hydrogen and carbon monoxid are produced, and by continuous removal of hydrogen in the manner described, both carbon monoxid and hydrogen may be conveniently prepared from steam and natural gas. Another example is the dissociation of the various alcohols to furnish aldehydes and hydrogen. On heating the vapors of ethyl-alcohol to the proper temperature, they tend to dissociate with molecular rearrangement, forming acetaldehyde and free hydrogen. This reaction, however, does not go forward to a satisfactory extent by simply heating to this temperature the vapors of alcohol.

In performing the described operation any suitable apparatus may be employed and the hydrogen-permeable wall may be of any suitable material. Many of the metals at temperatures such as those contemplated here, are readily permeable to hydrogen even when not porous. Platinum, nickel, iron, etc. walls will all transmit hydrogen. Palladium is particularly permeable. Metal walls of this character may be kept at any temperature by passing a heating current of electricity therethrough, or by conduction of heat from a supporting porous surface heated by embedded or other electric resistance wires. Porous walls, whether of metal or earthy material, also transmit hydrogen freely. Diffusion of gases through an orifice is inversely as the square root of the density, hydrogen for example, diffusing four times as fast as oxygen. The diffusion of hydrogen is therefore very much more rapid than that of the organic compounds which are mainly of relatively high vapor density. Consequently if the reaction is carried on in the chamber with a porous wall the hydrogen will escape much more rapidly than the other products of dissociation.

In removing the hydrogen beyond the permeable wall of the dissociation chamber, any suitable means may be employed, as for instance, suction or vacuum, or a current of any gas or vapor, such as the current of steam.

I regard my invention as covering the method of effecting dissociative reactions at a high but controlled temperature upon carbon compounds, or mixtures containing same, yielding hydrogen and another body upon dissociation. Most of such reactions are reversible, and in my invention the equilibrium attained at any given temperature is destroyed by a removal of the dissociation product, hydrogen, from the sphere of reaction by taking advantage of its high diffusing powers, by leading it off beyond a porous or permeable wall.

In the application of my process to the production of acetaldehyde from ethyl alcohol I have found that by subjecting ethyl alcohol vapor to a high temperature in a tube permeable to hydrogen and conducting away the hydrogen passing therethrough I can readily and economically alter the equilibrium point of the reaction and produce a greatly increased yield of acetaldehyde.

In the accompanying drawings wherein I have shown apparatus in which my process may be advantageously practised, Figure 1 is a diagrammatic view partly in section, of such apparatus and, Fig. 2 is a longitudinal sectional detail view of a modified form of reaction chamber.

In the drawings 1 designates a still adapted to be heated in any desired manner, as by a Bunsen burner 2. The still is connected as shown, by a tube 3 with a reaction chamber 4 comprising a porous earthen ware, unglazed porcelain or alundum tube 5, surrounded by a metal shell or casing 6 preferably cylindrical in form and concentric with the tube 5. The tube 5 may be maintained at any desired temperature by means of a heating coil 7 embedded in the tube and connected with a suitable source of electric current 8.

In the form of reaction chamber shown in Fig. 2 there is secured to the inner wall of the porous earthen ware or alundum tube 5' a thin sheet or film of platinum or palladium in the form of a tube 7' such sheet being preferably not exceeding one-thousandth of an inch in thickness. The tube may be heated by the heat from a coil of resistance wire as shown in Fig. 1 or each end of the platinum or palladium tube 7' may be connected with a suitable source of current 8' adapted to heat such tube to a bright red heat. The outlet end of the tube 5' is provided with a pressure relief valve 6' by means of which any desired pressure may be maintained in the tube 5'.

The porous earthen ware or alundum tube preferably contains rough fragments of alundum 9 charged with a suitable catalytic agent, preferably copper oxid and reduced copper, although satisfactory results may be obtained by the use of oxids of nickel, oxid of copper, reduced nickel, reduced copper and a number of other materials.

The shell or casing 6 is connected by the tube 10 with a cooling coil 11 which is in turn connected with a storage tank 13. The outlet tube 14 is connected with suitable means (not shown) for maintaining a slightly reduced pressure in storage tank 13 and in the shell or casing 6.

The cooling coil 11 and the coil 15 are maintained at any desired low temperature by a suitable refrigerating fluid which flows into and out of the chamber 16 through pipes 17 and 18 respectively. The storage tank 13 is provided with a jacket 19 containing a refrigerating fluid maintained at any desired low temperature, such fluid flowing into and out of the jacket through pipes 20 and 21 respectively.

The outlet end of the porous tube 5 is connected by a tube 22 with a cooling coil 23 which is maintained at any desired low temperature by a refrigerating fluid which flows into and out of the tank 24 through pipes 25 and 26 respectively.

The cooling coil 23 is connected by a tube 27 with the vessel 28 to the lower end of which is connected a tube 29 terminating within and near the lower portion of the still 1. The tube 29 is provided with a cut-off valve 30 as shown and has a branch 31 terminating near the bottom of the storage tank 13. This branch is provided with a cut-off valve 32.

The cooling coil 15 in the chamber 16 is connected at its upper end by a tube 33 with the vessel 28 as shown and at its lower end by a tube 34 with the storage tank 35. This tank is provided with a jacket 36 and is maintained at a desired low temperature by means of a refrigerating fluid which flows into and out of the jacket through pipes 37 and 38 respectively. The tank 35 is provided with a vent 39.

In using the apparatus illustrated, in the application of my process to the production of acetaldehyde, ethyl alcohol is heated in the still 1. The vapors pass into the tube 5 and are there subjected to a temperature sufficiently high to decompose the alcohol into hydrogen and acetaldehyde according to the reaction,

$$C_2H_5OH = H_2 + CH_3CHO$$

The temperature of the reaction may be widely varied but is preferably such as to produce the maximum yield of acetaldehyde. I prefer to employ a temperature of about 650° C. but I can obtain satisfactory results considerably above and below this temperature.

The decomposition of the alcohol in the porous tube 5 is facilitated by the employment of rough fragments of alundum charged with copper oxid and reduced copper, this material acting as a catalytic mass.

The pressure in the shell or casing 6 being maintained below that in the porous tube 5, the hydrogen produced in the reaction passes through the walls of such tube very rapidly because of its low density and accordingly alters the equilibrium point of the reaction, resulting in the production of a very large yield of acetaldehyde, although when the hydrogen is not thus withdrawn the equilibrium point is such as to cause the yield of acetaldehyde to be very poor.

I prefer to maintain such reduced pressure in the shell or casing 6 as will draw through the walls of the tube 5, small amounts of alcohol and acetaldehyde, although according to the law of diffusion of gases, the amounts of these materials drawn through are very small in proportion to the amount of hydrogen which diffuses through the porous walls of the tube 5.

The purpose of the cooling coil 11 and the storage tank 13 is to collect and save the small amounts of acetaldehyde and alcohol vapors which diffuses through the tube 5. The cooling coil 11 and the storage tank 13 are preferably maintained at a temperature of about 0° C. The condensed acetaldehyde and alcohol vapors collect in the storage tank 13 and by means of the valves 32, may be periodically allowed to flow through pipe 29 into the still 1. A rich mixture of acetaldehyde and alcohol passes the length of porous tube 5 and into the cooling coil 23 which I maintain at a temperature of about 30° C. The temperature serves to condense the alcohol but not the acetaldehyde, the alcohol collecting in vessels 28 from which by opening valve 30, it may be periodically returned through pipe 29 into the still 1. The acetaldehyde separated from the alcohol in vessel 28 passes through the cooling coil 15 which is preferably maintained at a temperature of 0° C., and there liquefies and flows down into storage tank 35 which is also maintained at 0° C. The hydrogen which is drawn off through tube 14 may be utilized for any desired purpose. By wholly or partially opening the valves 30 and 32 the return of the alcohol to the still 1 is rendered continuous instead of intermittent.

I have found that I may materially increase the efficiency of the process by providing the porous earthen ware or alundum tube with a thin lining of platinum, palladium or other material permeable only to hydrogen and maintaining such lining at a high temperature, preferably about 800° C.

The rate at which hydrogen diffuses through the porous wall of the tube 5 is so great, in comparison with the rate at which acetaldehyde and alcohol vapor pass therethrough that the apparatus as illustrated in Fig. 1 forms a most efficient and satisfactory means for preparing acetaldehyde from alcohol, but on other reversible reactions in which hydrogen is produced, I find it very desirable to alter the permeability of the porous tube by providing it with a thin layer of material permeable only to hydrogen.

The outlet end of the porous earthern ware or alundum tube may be advantageously provided with a pressure relief valve 6′ by means of which any desired pressure may be maintained within the porous tube. If a slight pressure in excess of atmospheric pressure be maintained in the porous earthen ware or alundum tube it is not necessary to apply suction to the tube 14. It is only necessary that the pressure within the porous tube should be slightly higher than the pressure of the outside of such tube in order to cause the hydrogen to permeate through the walls of the tube. The hydrogen will pass through the walls of the tube whenever there is a slightly higher pressure within the tube than there is outside of such tube whether this difference in pressure be brought about by suction applied to the outside of the tube or pressure applied inside of such tube.

While I have described the production of acetaldehyde as an example of the utilization of my process it is to be understood that the principle of altering the equilibrium point of any reversible reaction upon organic compounds containing hydrogen in which hydrogen is produced by carrying on such reaction in a chamber, tube or the like permeable to hydrogen, is of very general application and is not limited to the preparation of acetaldehyde as herein described, nor to the treatment of carbon compounds of the character referred to alone or unmixed with other materials or reagents. It is also to be understood that the use of equivalents is contemplated and that the details of practice of my process may be variously modified without departing from the spirit of my invention or the scope of the appended claims.

Having described my invention, I claim:—

1. The herein described process which comprises heating a carbon compound capable of undergoing a reversible reaction in which hydrogen is one of the products in a confined space and separating and withdrawing the hydrogen in an uncombined state during the process of the reaction.

2. The herein described process which comprises heating a carbon compound capable of undergoing a reversible reaction in which hydrogen is one of the products in a confined space in contact with a wall of material readily permeable to hydrogen but less permeable to the other materials present, and conducting away the hydrogen passing through such wall during the process of the reaction.

3. The herein described process which consists in heating a carbon compound capable of undergoing a reversible reaction in which hydrogen is one of the products in a confined space in contact with a wall of material readily permeable to hydrogen at a high temperature, but less permeable to the other materials present, heating the wall and conducting away the hydrogen passing through such wall during the progress of the reaction.

4. The herein described process which consists in heating a carbon compound capable of undergoing a reversible reaction in which hydrogen is one of the products in a tube readily permeable to hydrogen but less permeable to the other materials present and conducting away hydrogen passing through such tube during the progress of the reaction.

5. The herein described process of treating a carbon compound decomposable by heat in a reversible reaction and yielding hydrogen as one of the products thereof, which consists in heating such compound in a confined space in contact with a sheet of material permeable to hydrogen at the temperature of the reaction and conducting away the hydrogen passing through the sheet.

6. The herein described process of producing acetaldehyde which consists in heating ethyl alcohol to a suitable temperature to decompose the same into acetaldehyde and hydrogen and separating and removing the hydrogen in an uncombined state as produced.

7. The herein described process of producing acetaldehyde which consists in heating ethyl alcohol vapor in contact with a suitable catalytic agent, to a suitable temperature to decompose the same into acetaldehyde and hydrogen and separating and removing the hydrogen as produced.

8. The herein described process of producing acetaldehyde which consists in heating ethyl alcohol vapor to a suitable temperature to decompose the same into acetaldehyde and hydrogen, such heating being conducted in a confined space in contact with a sheet of material permeable to hydrogen and separating and removing the hydrogen as produced.

9. The herein described process of producing acetaldehyde which consists in heating ethyl alcohol vapor in a tube permeable to hydrogen at the temperature of the reaction and separating and removing the hydrogen as produced.

10. The herein described process of producing acetaldehyde which consists in heating ethyl alcohol to a suitable temperature to decompose the same into acetaldehyde and hydrogen in contact with a sheet of porous earthen ware permeable to hydrogen and removing the hydrogen as produced.

11. The herein described process of producing acetaldehyde which consists in heating ethyl alcohol to a suitable temperature to decompose the same into acetaldehyde and hydrogen in contact with a suitable catalytic agent, the heating operation being conducted in a tube of porous earthen ware more permeable to hydrogen than to the other materials present and conducting away the hydrogen passing through the tube.

12. The herein described process of producing acetaldehyde which consists in heating ethyl alcohol to a suitable temperature to decompose the same into acetaldehyde and hydrogen in a tube of porous earthen ware, maintaining a lower pressure outside than inside of said tube whereby the hydrogen and a small quantity of the vapors present in the tube will pass therethrough and condensing said vapors.

13. The herein described process of producing acetaldehyde which consists in heating ethyl alcohol to a suitable temperature to decompose the same into acetaldehyde and hydrogen in a tube of porous earthen ware, maintaining a lower pressure outside than inside of said tube whereby the hydrogen and a small quantity of the vapors present will pass therethrough and separating the hydrogen from the said vapors.

14. The herein described process of producing acetaldehyde which consists in heating ethyl alcohol to a suitable temperature to decompose the same into acetaldehyde and hydrogen in a porous earthen ware tube, maintaining a lower pressure outside than inside of said tube whereby the hydrogen and a small quantity of alcohol and acetaldehyde vapors will pass through the said tube, separating the hydrogen from the alcohol and acetaldehyde and returning the alcohol and acetaldehyde to the original charge of alcohol.

15. The herein described process of producing acetaldehyde which consists in heating ethyl alcohol in a tube of unglazed porcelain to a suitable temperature to decompose the same into acetaldehyde and hydrogen, withdrawing the hydrogen and a small quantity of alcohol and acetaldehyde vapors through the said tube, condensing the alcohol and acetaldehyde and returning them to the original charge, condensing the remaining alcohol and acetaldehyde, separating the alcohol from the acetaldehyde and returning the alcohol to the original charge.

16. The herein described process of producing acetaldehyde which consists in heating ethyl alcohol in a porous earthen ware tube to a suitable temperature to decompose the same into acetaldehyde and hydrogen, withdrawing the hydrogen and a small quantity of alcohol and acetaldehyde vapors through the walls of the said tube, cooling the said vapors and returning the condensed alcohol and acetaldehyde to the original charge, cooling the remaining alcohol and acetaldehyde vapors to a temperature below that at which the alcohol vapors will condense but above that at which acetaldehyde vapor will condense, separating the alcohol from the acetaldehyde, returning the alcohol to the original charge and condensing the acetaldehyde.

In testimony whereof I affix my signature in presence of two witnesses.

WALTER O. SNELLING.

Witnesses:
A. J. PHILLIPS,
MAY WILLIAMS.

Correction in Letters Patent No. 1,124,347

It is hereby certified that in Letters Patent No. 1,124,347, granted January 12, 1915, upon the application of Walter O. Snelling, of Pittsburgh, Pennsylvania, for an improvement in "Processes of Effecting Dissociative Reactions upon Carbon Compounds," an error appears in the printed specification requiring correction as follows: Page 3, lines 116 and 125, for the word "process" read *progress*; and that the said Letters Patent should be read with this correction therein that the same may conform to the record of the case in the Patent Office.

Signed and sealed this 16th day of March, A. D., 1915.

[SEAL.]
J. T. NEWTON,
*Acting Commissioner of Patents.*